(12) United States Patent
Hsu

(10) Patent No.: US 7,510,315 B2
(45) Date of Patent: Mar. 31, 2009

(54) LIGHT GUIDE PLATE HAVING A PLURALITY OF PROTRUSIONS AND BACKLIGHT MODULE HAVING SAME

(75) Inventor: Yu-Ju Hsu, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 138 days.

(21) Appl. No.: 11/644,102

(22) Filed: Dec. 21, 2006

(65) Prior Publication Data

US 2007/0147086 A1 Jun. 28, 2007

(30) Foreign Application Priority Data

Dec. 23, 2005 (TW) .............................. 94146271 A

(51) Int. Cl.
  *F21V 7/04* (2006.01)
(52) U.S. Cl. .................. 362/615; 362/625; 362/619
(58) Field of Classification Search .................. 362/612, 362/613, 617–620, 615, 623–626
See application file for complete search history.

(56) References Cited

U.S. PATENT DOCUMENTS

| 6,880,953 | B2 | 4/2005 | Shin et al. | |
| 7,131,764 | B2* | 11/2006 | Hsu et al. | 362/623 |
| 7,220,040 | B2* | 5/2007 | Lengyel et al. | 362/612 |
| 2006/0092669 | A1* | 5/2006 | Chen | 362/619 |

* cited by examiner

*Primary Examiner*—Bao Q Truong
(74) *Attorney, Agent, or Firm*—Wei Te Chung

(57) ABSTRACT

An exemplary light guide plate (23) has a light incident surface (231); at least one side surface (232), the side surface being connected with the light incident surface; a light emitting surface (233), orthogonal connected with the side surface and the light incident surface; and a bottom surface (234) opposite to the light emitting surface. At least one of the light emitting surface and the bottom surface has a plurality of protrusions (235) spaced a predetermined distance, each protrusion having a plurality of grooves (2351).

18 Claims, 3 Drawing Sheets

LIGHT GUIDE PLATE HAVING A PLURALITY OF PROTRUSIONS AND BACKLIGHT MODULE HAVING SAME

FIELD OF THE INVENTION

The present invention relates to light guide plates having a plurality of protrusions, and to backlight modules having a light guide plate.

GENERAL BACKGROUND

A typical liquid crystal display is capable of displaying a clear and sharp image through millions of pixels that make up the complete image. The liquid crystal display has thus been applied to various electronic equipment in which messages or pictures need to be displayed, such as mobile phones and notebook computers. However, liquid crystals in the liquid crystal display do not themselves emit light. Rather, the liquid crystals have to be lit up by a light source so as to clearly and sharply display text and images. The light source may be ambient light, or a backlight module attached to the liquid crystal display.

Referring to FIG. 6, a conventional backlight module 1 generally includes a light source 11, a reflective plate 12, a light guide plate 13, a diffusing plate 14, and a brightness enhancement plate 15. The reflective plate 12, the light guide plate 13, the diffusing plate 14, and the brightness enhancement plate 15 are arranged in that order from bottom to top. The light source 11 is positioned adjacent to a side edge of the light guide plate 13.

After light beams from the light source 11 enter the light guide plate 13, the light beams emit out from a top surface of the light guide plate 13 and enter the diffusing plate 14. The light beams are diffused to be uniform, and then enter the brightness enhancement plate 15. When emitting out from the brightness enhancement plate 15, the light beams are focused in a predetermined range of angles. Thus the light beams emitted from the backlight module 1 are uniform and have a high brightness.

However, in order to make the emitting light beams uniform, the backlight module 1 needs the diffusing plate 14. This adds to a thickness of the backlight module 1, makes assembly of the backlight module 1 relatively complicated, and makes the backlight module 1 unduly costly.

Therefore, a new light guide plate and a corresponding backlight module that can overcome the above-described problems are desired.

SUMMARY

In a preferred embodiment, an exemplary light guide plate has a light incident surface; at least one side surface, the side surface being connected with the light incident surface; a light emitting surface, orthogonal connected with the side surface and the light incident surface; and a bottom surface opposite to the light emitting surface. At least one of the light emitting surface and the bottom surface has a plurality of protrusions spaced a predetermined distance, each protrusion having a plurality of grooves.

In another preferred embodiment, an exemplary backlight module has a light guide plate. The light guide plate has at least one light incident surface; at least one side surface, the side surface being connected with the light incident surface; a light emitting surface, orthogonal connected with the side surface and the light incident surface; and a bottom surface opposite to the light emitting surface. The backlight module further has a plurality of light sources, disposed adjacent to the light incident surface; a reflector disposed under the bottom surface of the light guide plate; a brightness enhancement film disposed at the light emitting surface. At least one of the light emitting surface and the bottom surface has a plurality of protrusions spaced a predetermined distance, each protrusion having a plurality of grooves.

Other advantages and novel features will become more apparent from the following detailed description when taken in conjunction with the accompanying drawings. All the views in the drawings are schematic.

DETAILED DESCRIPTION OF PREFERRED EMBODIMENTS

Figure 1:
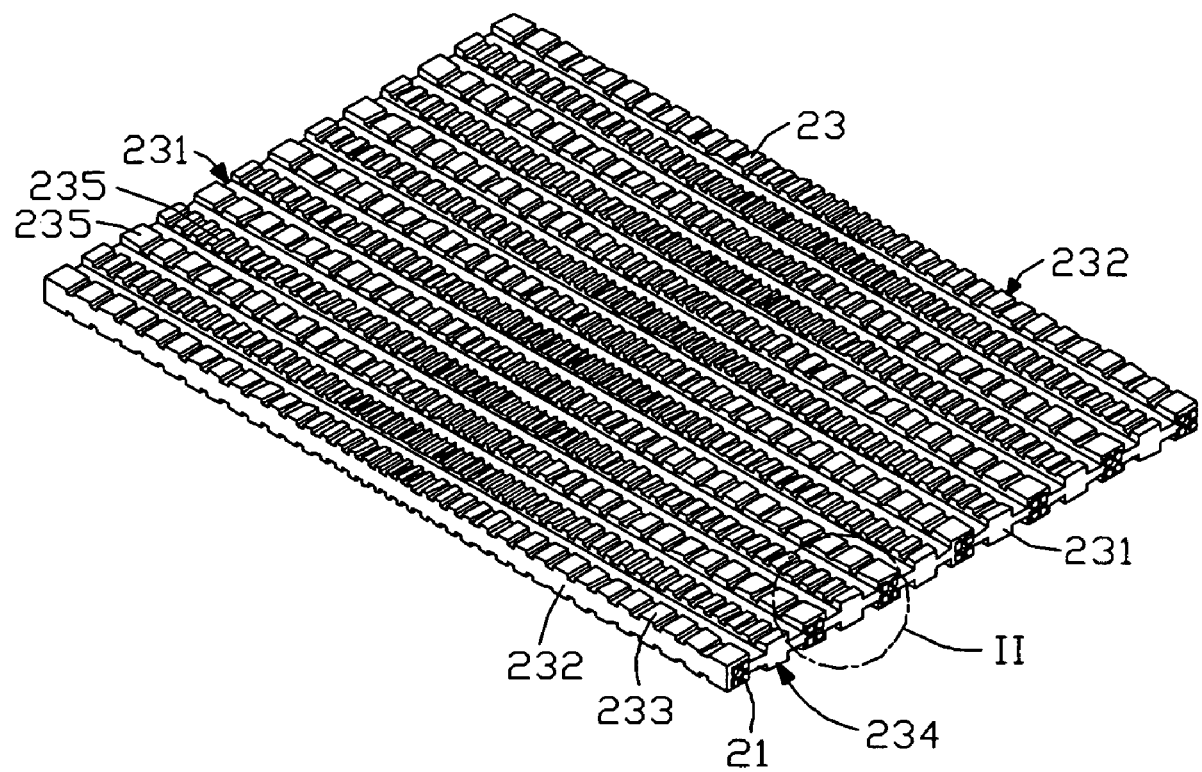
FIG. 1 is a schematic, isometric view of a light guide plate according a first embodiment of the present invention.

Referring to FIG. 1, a light guide plate 23 according to a first embodiment of the present invention is shown. The light guide plate 23 includes two light incident surfaces 231, two side surfaces 232, a light emitting surface 233, and a bottom surface 234. The two light incident surfaces 231 are opposite to each other, and the two side surfaces 232 are opposite to each other too. The two light incident surfaces 231 and the two side surfaces 232 are respectively orthogonally connected with the light emitting surface 233 and the bottom surface 234, the bottom surface 234 being opposite to the light emitting surface 233.

Figure 2:
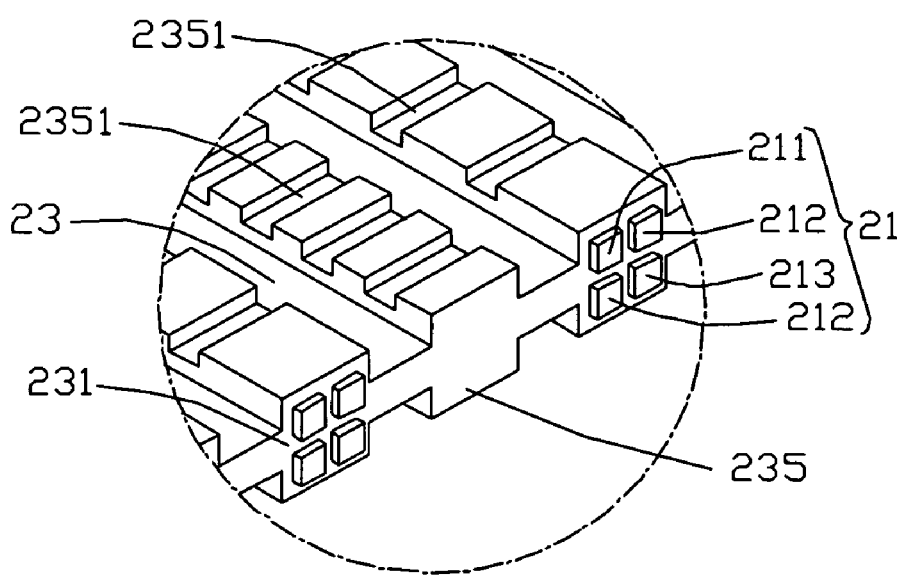
FIG. 2 is a partly enlarged view of circle portion II in FIG. 1.

Referring to FIG. 2, a partly enlarged view of circle portion II in FIG. 1 is shown. The bottom surface 234 and the light emitting surface 233 of light guide plate 23 respectively have a plurality of parallel strip-shaped protrusions 235 thereon, parallel to the side surfaces 232 of the light guide plate 23. The parallel protrusions 235 on the bottom surface 234 and the light emitting surface 233 correspond to each other. Each protrusion 235 has a plurality of parallel grooves 2351, extending along a direction orthogonal to the side surfaces 232. The distribution density decreases with increasing distance away from a middle area of each protrusion 235. In addition, the grooves 2351 on the two adjacent protrusions 235 has two different distribution densities, that is one protrusion 235 has dense grooves 2351 formed thereon, and the other adjacent protrusion 235 has sparsely grooves 2351 formed thereon.

Light sources 21 are embedded into some areas of the two light incident surfaces 231, the areas corresponding to the protrusions 235 having sparsely grooves 2351 formed thereon. Each light source 21 includes four light emitting diodes (LEDs), which are a red LED 211, two green LEDs 212, a blue LED 213. When voltage is provided on the light sources 21, red/green/blue light beams are guided into the light guide plate 23 from the two light incident surfaces 231, which are mixed in the light guide plate 23 to attain a white light beams. Because the light guide plate 23 has a plurality of strip-shaped protrusions 235 having a plurality of grooves 2351 formed thereon, the white light beams transmit out through the light emitting surface 233 after being totally reflected in the strip-shaped protrusions 2351 time after time. Thus, the light guide plate 23 can attain a uniform emitting light beams over the whole light emitting surface 233. In addition, a designer can adjust the density and structure to attain an ideal uniformity and control directions of the emitting light beams.

In addition, the light source 21 can be a light emitting diode, which has a red light emitting chip, two green light emitting chips, a blue light emitting chip. The red light beams, green light beams, and blue light beams produced by the red/green/blue chips are mixed to a white light beams in the light source 21. After that, the white light beams are then transmitted into the light guide plate 23 through the light incident surfaces 231.

The light guide plate 23 is made from Polymethyl Methacrylate (PMMA) or polycarbonate (PC). The plurality of protrusions 235 having a plurality of grooves 2351 can be made by injection molding method. A mold used in the injection molding method can be manufactured by utilizing electron beams or laser beams to cure the mold to produce a structure corresponding to the plurality of protrusions 235.

In an alternative embodiment, the plurality of protrusions 235 having a plurality of grooves 2351 can only be formed on one of the light emitting surface 233 and the bottom surface 234.

Figure 3:
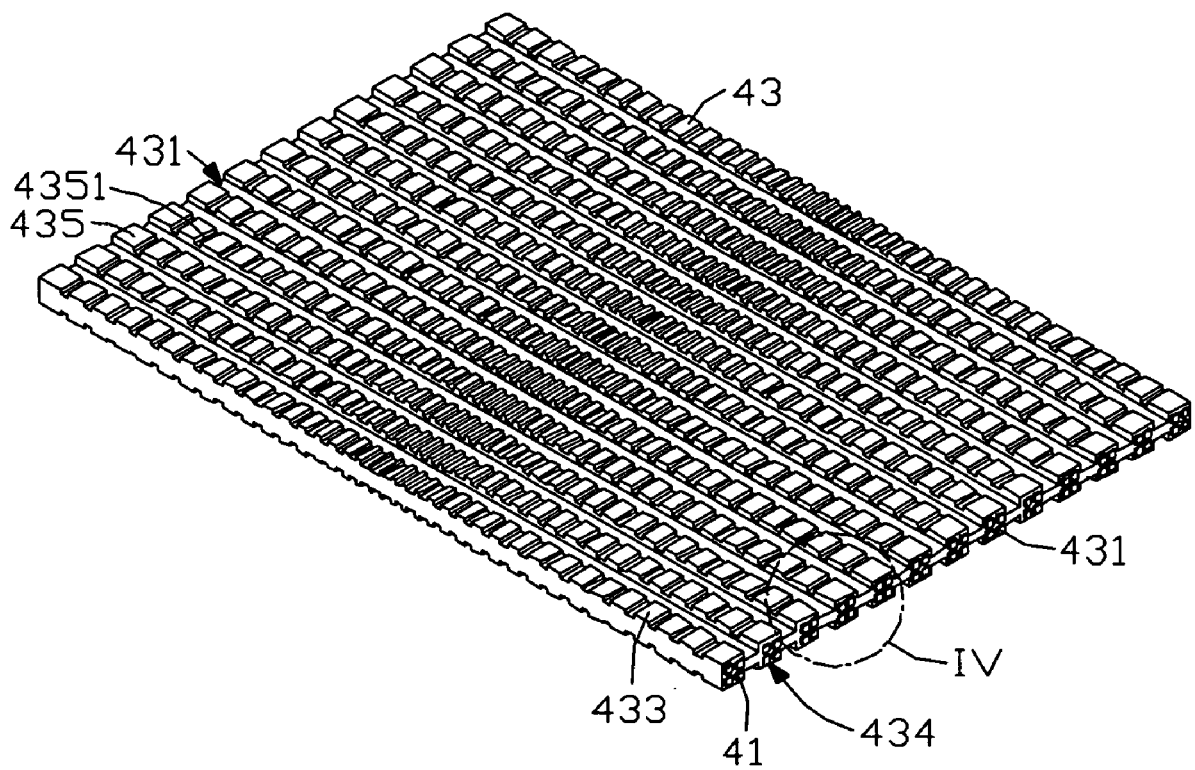
FIG. 3 is a schematic, isometric view of a light guide plate according a second embodiment of the present invention.
Figure 4:
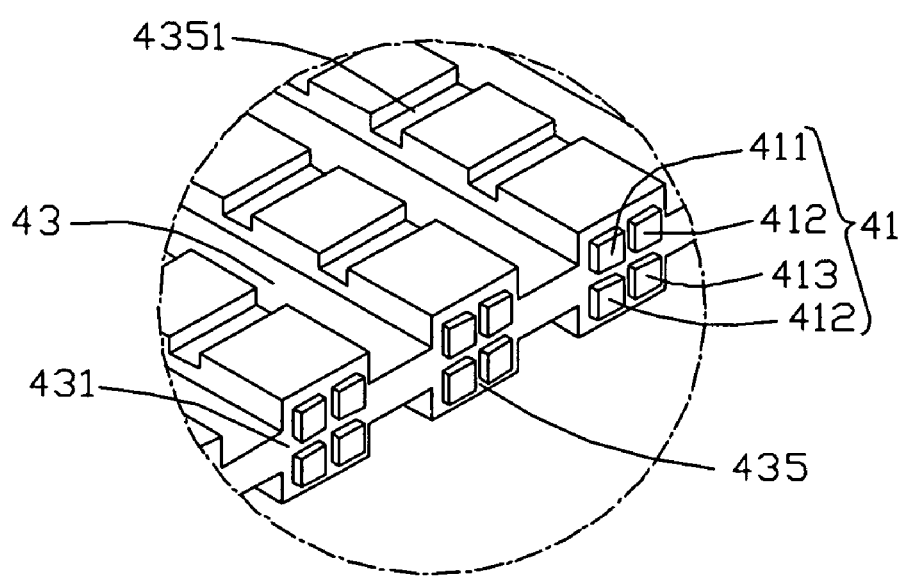
FIG. 4 is a partly enlarged view of circle portion IV in FIG. 3.

FIG. 3 shows a light guide plate according to a second embodiment of the present invention. FIG. 4 is a partly enlarged view of the circle portion IV. The light guide plate 43 has a structure same to that of the light guide plate 23 except that a plurality of grooves 4351 on each strip-shaped protrusion 435 of a light emitting surface 433 and a bottom surface 435 have a same distribution density.

Light sources 41 are embedded into two opposite light incident surfaces 431, corresponding to each protrusion 435. Each light source 41 includes four light emitting diodes (LEDs), which are a red LED 411, two green LEDs 412, a blue LED 413.

In addition, the plurality of protrusions 435 having a plurality of grooves 4351 can only be formed on one of the light emitting surface 433 and the bottom surface 434.

Because the light guide plate 43 has a plurality of strip-shaped protrusions 435 having a plurality of grooves 4351 formed on at least one of the light emitting surface 433 and the bottom surface 434, the white light beams transmit out through the light emitting surface 433 after being totally reflected in the strip-shaped protrusions 4351 time after time. Thus, the light guide plate 43 can attain a uniform emitting light beams over the whole light emitting surface 433.

Figure 5:
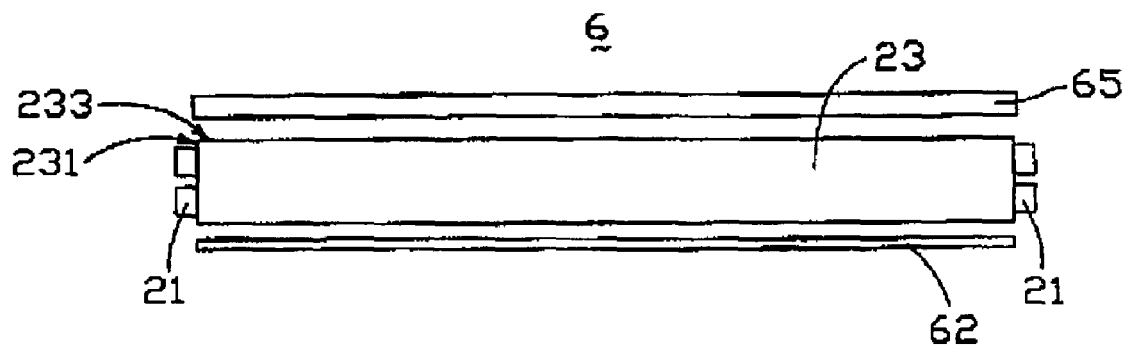
FIG. 5 is a schematic, side view of a backlight module according to a third embodiment of the present invention.
Figure 6:
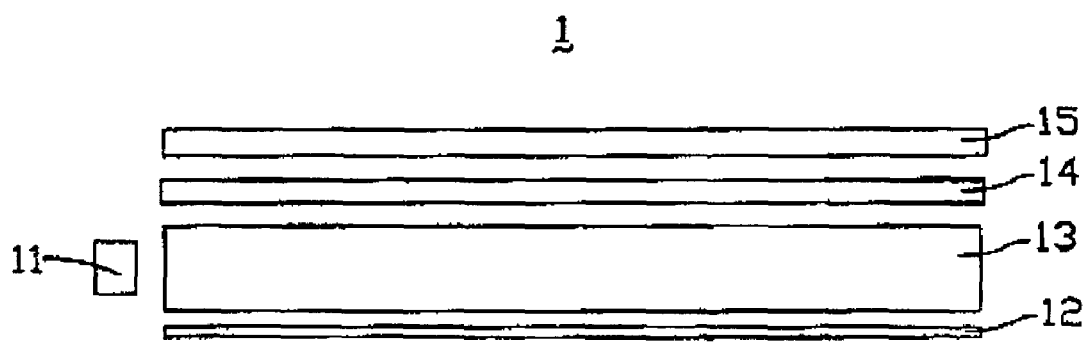
FIG. 6 is a schematic, side view of a conventional backlight module.

FIG. 5 shows a backlight module according to the third embodiment of the present invention. The backlight module 6 has the light guide plate 23, the plurality of light sources 21, a reflector 62 and a brightness enhancement film 65. The reflector 62, the light guide plate 23, and the brightness enhancement film 65 are sequentially disposed together in that order, from bottom to top. The plurality of light sources 21 are embedded into the two opposite light incident surfaces 231.

Light beams from the light sources 21 are guided into the light guide plate 23 through the light incident surface 231, which are totally reflected in the light guide plate 21. After that, some light beams transmit out from the light emitting surface 233 of the light guide plate 23 and some light beams are reflected by the reflector 62 to the light emitting surface 233. Finally, light beams uniformly propagate into the brightness enhancement film 65, which are converged in a predetermined viewing range for enhancing the brightness of the backlight module 6.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guide plate comprising:
   a light incident surface;
   at least one side surface, the side surface being connected with the light incident surface;
   a light emitting surface, orthogonal connected with the side surface and the light incident surface; and
   a bottom surface opposite to the light emitting surface;
   wherein at least one of the light emitting surface and the bottom surface has a plurality of protrusions formed thereat, two adjacent protrusions spaced a predetermined distance, each protrusion having a plurality of grooves formed thereat, and the distribution density of the grooves decreasing with increasing distance away from a middle area of the light guide plate.

2. The light guide plate as claimed in claim 1, wherein the protrusion is strip-shaped.

3. The light guide plate as claimed in claim 1, wherein the protrusions are formed on the light emitting surface and the bottom surface correspond to each other.

4. The light guide plate as claimed in claim 1, wherein the protrusions extend along a direction parallel to the side surface of the light guide plate.

5. The light guide plate as claimed in claim 1, wherein the grooves formed at the protrusions extend along a direction vertical to the side surface of the light guide plate.

6. The light guide plate as claimed in claim 5, wherein the grooves on the two adjacent protrusions has same distribution densities.

7. A backlight module comprising:
   a light guide plate, which has at least one light incident surface; at least one side surface, the side surface being connected with the light incident surface; a light emitting surface, orthogonal connected with the side surface and the light incident surface; and a bottom surface opposite to the light emitting surface;
   a plurality of light sources, disposed adjacent to the light incident surface;
   a reflector disposed under the bottom surface of the light guide plate;
   a brightness enhancement film disposed at the light emitting surface; and
   wherein at least one of the light emitting surface and the bottom surface has a plurality of protrusions formed thereat, two adjacent protrusions spaced a predetermined distance, each protrusion having a plurality of grooves formed thereat, and the distribution density of the grooves decreasing with increasing distance away from a middle area of the light guide plate.

8. The backlight module as claimed in claim 7, wherein the protrusion is strip-shaped.

9. The backlight module as claimed in claim 7, wherein the protrusions are formed on the light emitting surface and the bottom surface correspond to each other.

10. The back light module as claimed in claim 7, wherein the protrusions extend along a direction parallel to the side surface of the light guide plate.

11. The backlight module as claimed in claim 7, wherein the grooves formed at the protrusions extend along a direction vertical to the side surface of the light guide plate.

12. The backlight module as claimed in claim 7, wherein the grooves on the two adjacent protrusions has two different distribution densities, that is one protrusion has dense grooves formed thereon, and the other adjacent protrusion has sparsely grooves formed thereon.

13. The backlight module as claimed in claim 7, wherein the grooves on the two adjacent protrusions have same distribution densities.

14. The backlight module as claimed in claim 7, wherein the light guide plate has two light incident surfaces opposite to each other, the plurality of light sources being disposed at the two light incident surfaces corresponding to the protrusions.

15. The backlight module as claimed in claim 7, wherein each light source is multi-color mixed light source.

16. The backlight module as claimed in claim 7, wherein each light source has a red light emitting diode (LED), two green LEDs, and a blue LED.

17. The backlight module as claimed in claim 7, wherein each light source is a light emitting diode, which has a red light emitting chip, two green chips, and a blue chip.

18. A light guide plate comprising:
a light incident surface;
at least one side surface, the side surface being connected with the light incident surface;
a light emitting surface, orthogonal connected with the side surface and the light incident surface; and
a bottom surface opposite to the light emitting surface;
wherein at least one of the light emitting surface and the bottom surface has a plurality of protrusions formed thereat, two adjacent protrusions spaced a predetermined distance, each protrusion having a plurality of grooves formed thereat, the grooves formed at the protrusions extending along a direction vertical to the side surface of the light guide plate, the grooves on the two adjacent protrusions having two different distribution densities, that is one protrusion has dense grooves formed thereon, and the other adjacent protrusion has sparsely grooves formed thereon.

* * * * *